(12) United States Patent
Tamaizumi

(10) Patent No.: US 7,918,306 B2
(45) Date of Patent: Apr. 5, 2011

(54) ELECTRIC POWER STEERING APPARATUS

(75) Inventor: Terutaka Tamaizumi, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 865 days.

(21) Appl. No.: 11/524,671

(22) Filed: Sep. 21, 2006

(65) Prior Publication Data
US 2007/0114094 A1   May 24, 2007

(30) Foreign Application Priority Data
Sep. 21, 2005   (JP) ................. 2005-273892

(51) Int. Cl.
*B62D 5/04*   (2006.01)
(52) U.S. Cl. .................... 180/446; 180/443; 701/41
(58) Field of Classification Search .......... 180/443, 180/446; 701/41
See application file for complete search history.

(56) References Cited

U.S. PATENT DOCUMENTS

| | | | | |
|---|---|---|---|---|
| 4,629,024 A | * | 12/1986 | Buike et al. .............. | 180/444 |
| 4,862,851 A | * | 9/1989 | Washino et al. ......... | 123/339.11 |
| 4,896,089 A | * | 1/1990 | Kliman et al. ............. | 318/701 |
| 5,483,446 A | * | 1/1996 | Momose et al. ............ | 701/1 |
| 5,485,067 A | * | 1/1996 | Nishimoto et al. .......... | 318/466 |
| 6,148,948 A | * | 11/2000 | Shimizu et al. ............. | 180/446 |
| 6,691,818 B2 | * | 2/2004 | Endo et al. ................ | 180/446 |
| 7,242,161 B2 | * | 7/2007 | Okamoto et al. ........... | 318/432 |
| 2002/0060538 A1 | | 5/2002 | Hara et al. | |
| 2002/0125064 A1 | * | 9/2002 | Mori et al. ................. | 180/444 |

FOREIGN PATENT DOCUMENTS

| | | |
|---|---|---|
| DE | 101 11 217 | 2/2002 |
| JP | 08-020350 | 1/1996 |

* cited by examiner

*Primary Examiner* — Lesley Morris
*Assistant Examiner* — Maurice Williams
(74) *Attorney, Agent, or Firm* — Jordan and Hamburg LLP

(57) ABSTRACT

In an electric power steering apparatus, a phase control characteristic for a signal corresponding to detected steering torque is changed according to the judgment whether the steering is in a return steering state or a feed steering state, so that a response of a variation of target output value of a motor for generating steering assist power to a variation of the detected steering torque decreases in the return steering state in comparison with that in the feed steering state. An output control characteristic of the motor is changed according to the judgment synchronously with the change of the phase control characteristic, so that a response of a variation of the output command value to a variation of deviation between the target output value and actual output value decreases in the return steering state in comparison with that in the feed steering state.

5 Claims, 12 Drawing Sheets

$\omega_a = 1 / 2 \pi T_1$
$\omega_b = 1 / 2 \pi \alpha T_1$ $\omega_1 = 1 / 2 \pi T_5$
$\omega_2 = 1 / 2 \pi a_5 T_5$
$\omega_3 = 1 / 2 \pi a_6 T_6$
$\omega_4 = 1 / 2 \pi T_6$ $\omega_1 = 1 / 2 \pi T_5$
$\omega_2 = 1 / 2 \pi a_5 T_5$
$\omega_3 = 1 / 2 \pi a_6 T_6$
$\omega_4 = 1 / 2 \pi T_6$ $\omega_5 = 1 / 2 \pi T_7$
$\omega_6 = 1 / 2 \pi a_7 T_7$
$\omega_7 = 1 / 2 \pi a_8 T_8$
$\omega_8 = 1 / 2 \pi T_8$ $\omega_5 = 1 / 2 \pi T_7$
$\omega_6 = 1 / 2 \pi a_7 T_7$
$\omega_7 = 1 / 2 \pi a_8 T_8$
$\omega_8 = 1 / 2 \pi T_8$

ELECTRIC POWER STEERING APPARATUS

FIELD OF THE INVENTION

The present invention relates to an electric power steering apparatus providing steering assist power with a motor.

DESCRIPTION OF THE RELATED ART

In an electric power steering apparatus, a correspondence relationship between the steering torque and assist torque is stored as an assist characteristic, and a motor for generating the steering assist power is controlled so as to generate the steering assist power according to the assist torque corresponding to the steering torque detected with a torque sensor. When the deviation between the target output value of a motor drive current and an actual output value detected by a current sensor is reduced in the motor control, the cut-off frequency of a low-pass filter through which the detection signal of the motor drive current passes is made larger in a return steering state than in a feed steering state. As a result, even in a state in which the motor generates the counter electromotive force, e.g., because the hands are taken off the steering wheel for the return steering, the high-frequency component of this counter electromotive force is reflected in the control and the motor drive current is converged to a target value with good stability (Japanese Patent Application Laid-open No. 8-20350).

SUMMARY OF THE INVENTION

However, when the steering torque decreases abruptly, e.g., because the hands are taken off the steering wheel for the return steering, the steering assist power acting in the feed steering direction decreases rapidly. The resultant problem is that the return to the straight travelling steering position of the steering wheel becomes very rapid and the convergence of the steering wheel degrades. It is an object of the present invention to provide an electric power steering apparatus capable of solving this problem.

The electric power steering apparatus in accordance with the present invention comprises a motor for generating steering assist power, a torque sensor for detecting steering torque, a storage element for storing a corresponding relationship between the steering torque and target output value of the motor, a calculation element for calculating the target output value with the detected steering torque and the corresponding relationship, a detection element for detecting actual output value of the motor, an output control element for controlling output of the motor according to output command value corresponding to deviation between the target output value and the actual output value so as to eliminate the deviation, a phase control element for a signal corresponding to the detected steering torque, and a steering state judgment element for judging whether a steering wheel is in a return steering state in which the steering wheel is steered toward the straight travelling steering position or a feed steering state in which the steering wheel is steered away from the straight travelling steering position, wherein a phase control characteristic of the phase control element is changed according to the judgment by the steering state judgment element so that a response of a variation of the target output value to a variation of the detected steering torque in the return steering state decreased in comparison with that in the feed steering state, and an output control characteristic of the output control element is changed according to the judgment by the steering state judgment element synchronously with the change of the phase control characteristic of the phase control element so that a response of a variation of the output command value to a variation of the deviation between the target output value and the actual output value in the return steering state decreases in comparison with that in the feed steering state.

In accordance with the present invention, the response of the variation of the target output value to the variation of the steering torque in the return steering state is decreased in comparison with that in the feed steering state, by varying the phase of the signal that varies correspondingly to the steering torque detected by the torque sensor, by the change of the phase control characteristic of the phase control element. As a result, even if the steering torque acting in the feed steering direction decreases abruptly during the return steering, the rapid decrease of the output of the motor for generating the steering assist power can be inhibited. Therefore, the convergence of the steering wheel can be improved because there is no rapid variation of the steering assist power acting in the feed steering direction during the return steering.

Furthermore, by changing the output control characteristic of the output control element synchronously with the change of the phase control characteristic of the phase control element, the response of the variation of the output command value to the variation of the deviation between the target output value and the actual output value can be reduced synchronously with the decrease in the response of the target output value to the steering torque. As a result, the rapid decrease in the motor output during the return steering can be inhibited more reliably.

It is preferred that the phase control characteristic of the phase control element is changed according to the judgment by the steering state judgment element by decreasing a gain in the return steering state in comparison with that in the feed steering state in a high frequency side of a frequency response characteristic of output to input of the torque sensor.

As a result, by decreasing the gain in the return steering state in comparison with that in the feed steering state in the high frequency side of the frequency response characteristic of the output to input of the torque sensor, the rapid decrease of the target output value can be inhibited even when the actual steering torque decreases abruptly during the return steering, so that the response of the variation of the target output value to the variation of the steering torque can be decreased reliably.

It is preferred that the output control element determines the output command value by calculations including at least a proportional integral control calculation, and that the output control characteristic of the output control element is changed by decreasing a gain in the return steering state in comparison with that in the feed steering state in a high frequency side of a frequency response characteristic of the output command value to the deviation.

By decreasing the gain in the return steering state in comparison with that in the feed steering state in the high frequency side of the frequency response characteristic of the output command value to the deviation between the target output value and the actual output value, the rapid decrease in the motor output can be reliably inhibited even when the steering torque acting in the feed steering direction decreases abruptly during the return steering.

It is preferred that the electric power steering apparatus in accordance with the present invention further comprises a storage element for storing a corresponding relationship between the steering torque and basic assist torque, wherein the corresponding relationship between the steering torque and the basic assist torque is set so that an assist gradient that is a variation rate of the basic assist torque to the steering torque varies in response to variation of the detected steering torque, and the phase control characteristic of the phase control element is changed according to the assist gradient so that the gain is decreased when the assist gradient increases in comparison with that before the increase of the assist gradient in a high frequency side of the frequency response characteristic of the output to input of the torque sensor.

As a result, the stability of control can be increased when the assist gradient increases.

It is preferred that the electric power steering apparatus in accordance with the present invention further comprises a calculation element for calculating a variation rate of the detected steering torque, wherein the target output value is decreased by the increase in the variation rate of the detected steering torque in the feed steering state, and the target output value is uncorrelated with the variation rate of the detected steering torque in the return steering state.

As a result, the motor output is prevented from becoming too large in the case where a rapid steering is performed in the feed steering state, whereby the steering feeling can be improved. Moreover, when the steering torque decreases abruptly as a result of, e.g., removing hands from the steering wheel in the return steering state, the motor output can be prevented from decreasing rapidly.

With the electric power steering apparatus in accordance with the present invention, the convergence of the steering wheel during the return steering can be improved, control stability can be increased and steering feeling during the feed steering can be improved.

DESCRIPTION OF THE PREFERRED EMBODIMENT

Figure 1:
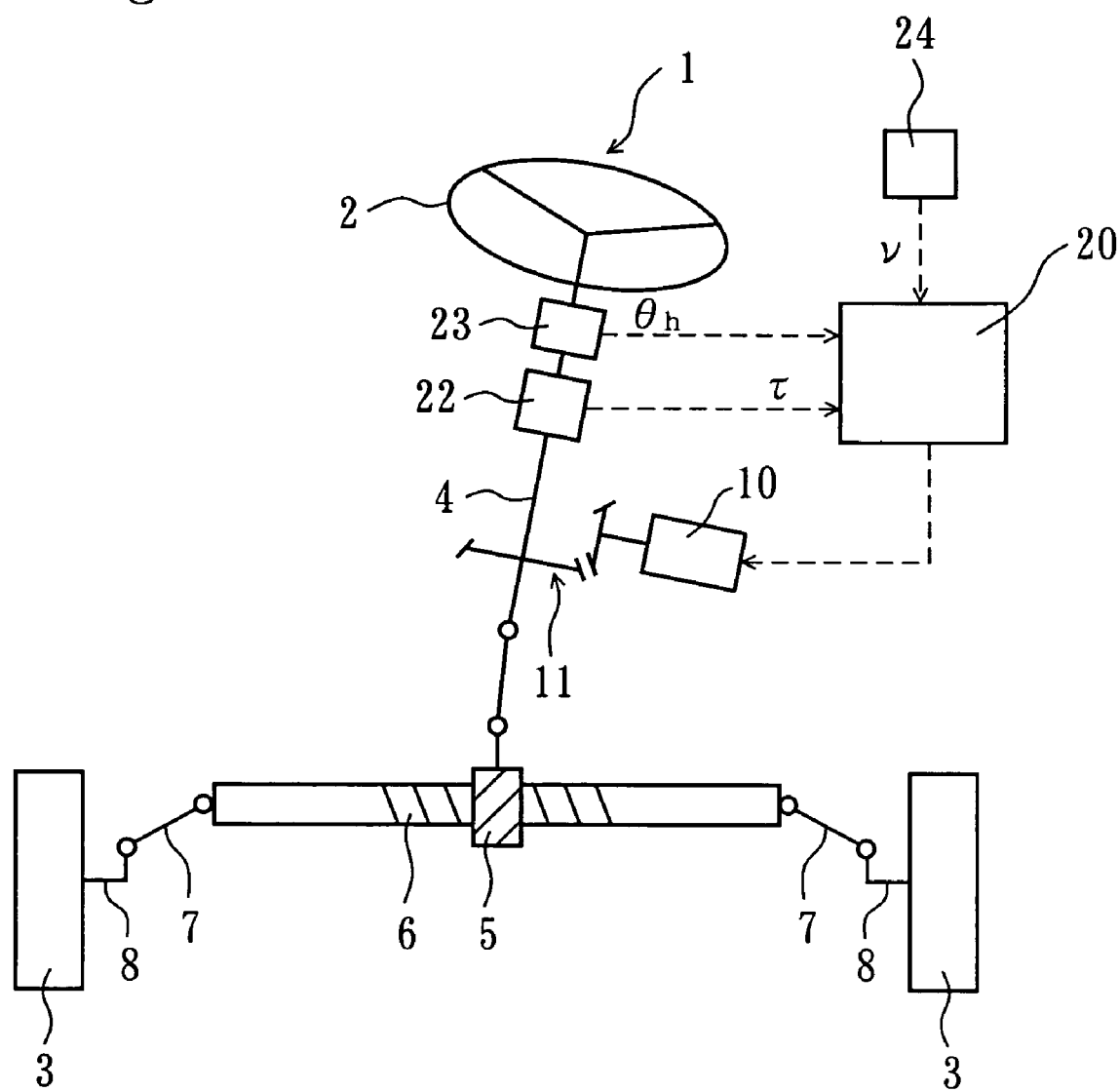
FIG. 1 is a structural explanatory drawing of an electric power steering apparatus of an embodiment of the present invention.

An electric power steering apparatus 1 of an embodiment of the present invention shown in FIG. 1 comprises a mechanism that transmits the rotation of a steering wheel 2 produced by steering operation to wheels 3 so as to change the steering angle of a vehicle. In the present embodiment, the rotation of the steering wheel 2 is transmitted to a pinion 5 via a steering shaft 4, whereby a rack 6 engaged with the pinion 5 is moved, and the movement of the rack 6 is transmitted to the wheels 3 via tie rods 7 and knuckle arms 8 to change the steering angle.

A motor 10 for generating steering assist power is provided. The motor 10 of the present embodiment is a three-phase brushless motor. The rotation of the output shaft of the motor 10 is transmitted to the steering shaft 4 via a reduction gear mechanism 11. As a result, the steering assist power acts on the path by which the rotation of the steering wheel 2 is transmitted to the wheels 3.

The motor 10 is connected to a controller 20. A torque sensor 22 that detects steering torque $\tau$ of the steering wheel 2, a steering angle sensor 23 that detects steering angle $\theta_h$ corresponding to the rotation angle of the steering wheel 2 and a vehicle speed sensor 24 that detects vehicle speed v are connected to the controller 20.

Figure 2:
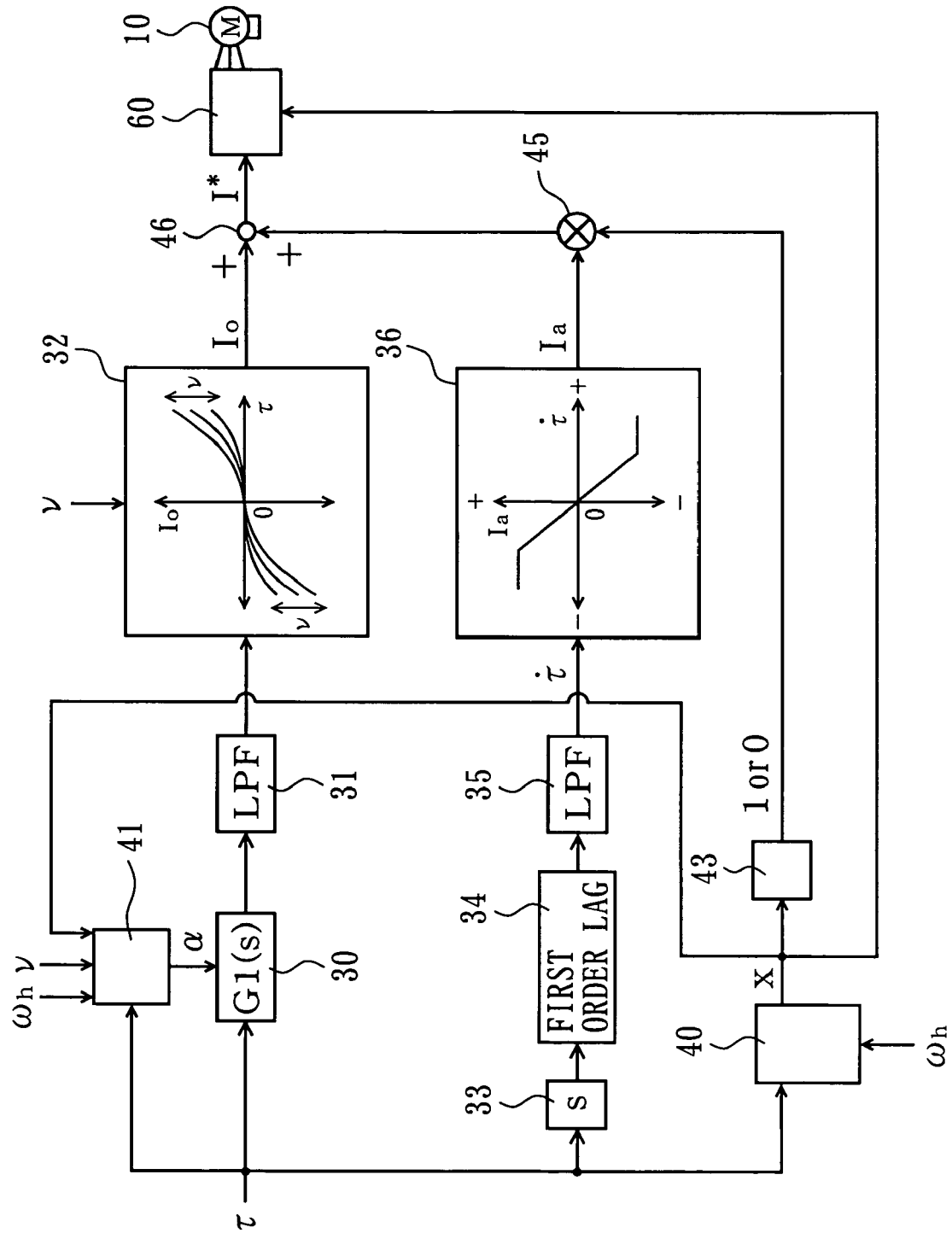
FIG. 2 is a block diagram illustrating a configuration of a controller in the electric power steering apparatus of the embodiment of the present invention.

FIG. 2 is a block diagram illustrating the configuration of the controller 20 that has a phase control element 30. The phase control element 30 controls the phase of the output signal of the torque sensor 22, which is a signal corresponding to the detected steering torque $\tau$. The transfer function $G1(s)$ of the phase control element 30 of the present embodiment is expressed by the following formula where s is a Laplacian, $T_1$ is a time constant, and $\alpha$ ($0<\alpha\leq1$) is a coefficient.

$$G1(s)=(1+\alpha T_1 s)/(1+T_1 s)$$

The coefficient $\alpha$ is set in the first coefficient setting element 41.

Figure 3:
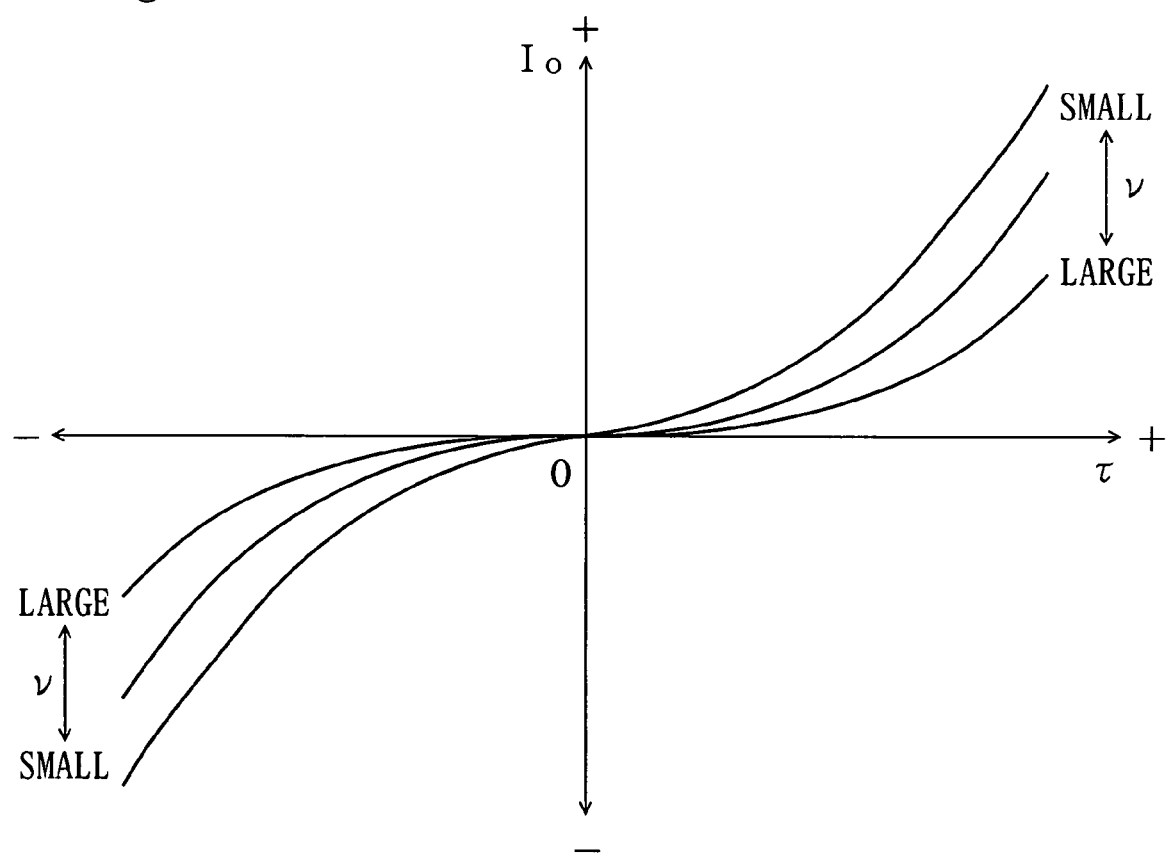
FIG. 3 illustrates a relationship between a steering torque, basic assist current and vehicle speed in the electric power steering apparatus of the embodiment of the present invention.

The signal whose phase is controlled by the phase control element 30 is input into a calculation element 32 after the unnecessary high-frequency component is removed therefrom by a low-pass filter 31. The assist characteristic that represents the correspondence relationship between the steering torque $\tau$, vehicle speed v and basic assist current $I_o$ is stored in the form of, for example, a table or calculation formula in the controller 20. In the calculation element 32, the basic assist current $I_o$ is calculated from the detected steering torque $\tau$ and detected vehicle speed v with the assist characteristic. In the correspondence relationship between the steering torque $\tau$, vehicle speed v and basic assist current $I_o$ of the present embodiment, as shown in FIG. 3, if the vehicle speed v is constant, the magnitude of the basic assist current $I_o$ increases with the increase in the magnitude of the steering torque τ, and if the steering torque τ is constant, the magnitude of the basic assist current $I_o$ increases with the decrease in the vehicle speed v. As for the plus or minus signs of the steering torque τ and basic assist current $I_o$, the signs are plus in a state of steering in one of the left and right directions, and the signs are minus in a state of steering in the other direction. The basic assist current $I_o$ corresponds to a basic assist torque $τ_o$.

Furthermore, the output signal of the torque sensor 22 is inputted into a differentiator 33. The differentiator 33 functions as an element for calculating variation rate (dτ/dt) of the detected steering torque τ, and the signal corresponding to the variation rate dτ/dt is input into a calculation element 36 via a first order lag element 34 and a low-pass filter 35. The unnecessary high-frequency component is removed from the signal corresponding to the variation rate dτ/dt with the low-pass filter 35. In the calculation element 36, an additional assist current $I_a$ inversely correlated with the variation rate of the detected steering torque τ is calculated. As shown in the calculation element 36 in FIG. 2, the variation rate of the steering torque τ is positive and the additional assist current $I_a$ is negative in a state of steering in one of the left and right directions, and the variation rate of the steering torque τ is negative and the additional assist current $I_a$ is positive in a state of steering in the other direction.

Further, the output signal of the torque sensor 22 is input into a steering state judgment element 40. The steering state judgment element 40 judges whether the steering wheel 2 is in a return steering state in which the steering wheel 2 is steered toward the straight travelling steering position or a feed steering state in which the steering wheel is steered away from the straight travelling steering position. The steering state judgment element 40 of the present embodiment compares the plus or minus sign of the steering torque τ, whose sign in a state of steering to the right direction is inverse to that in a state of steering to the left direction, with the plus or minus sign of the steering angular velocity $ω_h$, whose sign at the time when the steering wheel 2 is turned to the right direction is inverse to that at the time when the steering wheel 2 is turned to the left direction, and judges that it is a feed steering state when the signs match and that it is a return steering state when the signs do not match. A steering state judgment signal x corresponding to the judgment result is input into a first coefficient setting element 41, an open-close signal output element 43 and an output control element 60. The steering angular velocity $ω_h$ is calculated by differentiating the detected steering angle $θ_h$ determined with the steering sensor 23 with a differentiator (not shown in the figure).

The open-close signal output element 43 outputs a signal corresponding to 1 in the feed steering state and outputs a signal corresponding to zero in the return steering state to a multiplier 45. In the multiplier 45, a value calculated by multiplying the additional assist current $I_a$ by the output signal from the open-close signal output element 43 is calculated. The sum of the value calculated in the multiplier 45 and the basic assist current $I_o$ is calculated as a target drive current I* in an addition element 46. In the present embodiment, the target drive current I* corresponds to the target output value of the motor 10. Accordingly, the controller 20 constitutes a storage element for storing the correspondence relationship between the steering torque τ and the target drive current I* of the motor 10, and a calculation element for calculating the target drive current I* with the stored correspondence relationship and detected steering torque τ. The value obtained in the multiplier 45 corresponds to the additional assist current $I_a$ in the feed steering state, and it is zero in the return steering state. Therefore, the sum of the basic assist current $I_o$ and the additional assist current $I_a$ becomes the target drive current I* in the feed steering state, and the basic assist current $I_o$ becomes the target drive current I* in the return steering state. Because the additional assist current $I_a$ is inversely correlated with the variation rate of the detected steering torque τ, the magnitude of the target drive current I* is decreased by the increase of the magnitude of the variation rate of the detected steering torque τ in the feed steering state. In the return steering state, the magnitude of the target drive current I* is uncorrelated with the magnitude of the variation rate of the detected steering torque τ.

Figure 4:
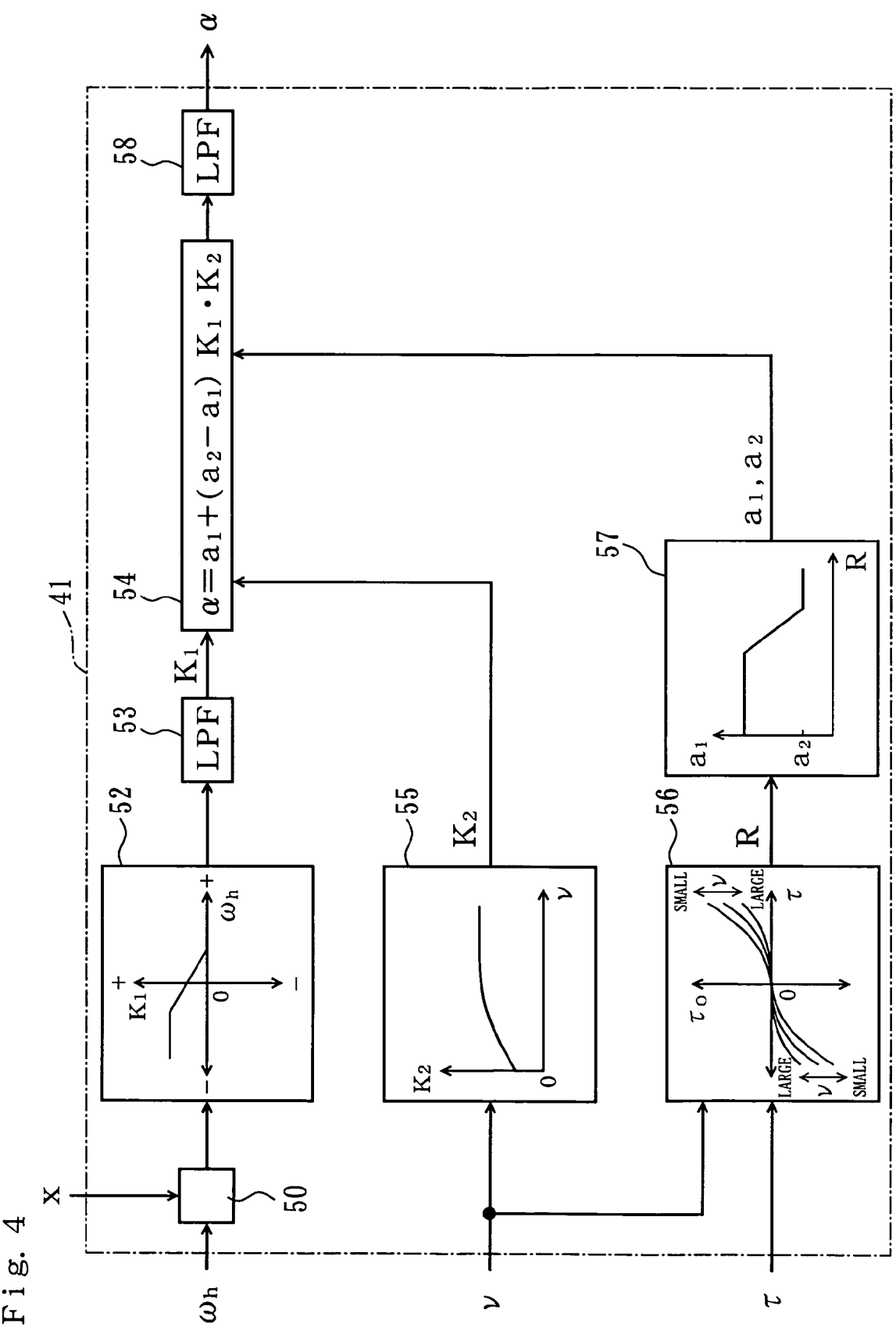
FIG. 4 is a block diagram illustrating a configuration of a first coefficient setting element in the electric power steering apparatus of the embodiment of the present invention.

The coefficient α in the transfer function G1(s) of the phase control element 30 is set by the first coefficient setting element 41, and is changed according to the judgment by the steering state judgment element 40. To be more precise, FIG. 4 is a block diagram illustrating the configuration of the first coefficient setting element 41 in which a steering state judgment signal x is input into a sign setting element 50. The sign setting element 50 sets the sign of the steering angular velocity $ω_h$ to plus in the feed steering state and to minus in the return steering state. Thus, the sign of the steering angular velocity $ω_h$ prior to inputting into the sign setting element 50 is set according to the rotation direction of the steering wheel 2, and the sign of the steering angular velocity $ω_h$ output from the sign setting element 50 is set according to whether it is the return steering state or the feed steering state.

A gain $K_1$ corresponding to the value of the steering angular velocity $ω_h$ output from the sign setting element 50 is calculated in a calculation element 52. The relationship between the gain $K_1$ and steering angular velocity $ω_h$ is predetermined and stored in the controller 20. In the present embodiment, as shown in the calculation element 52 in FIG. 4, the gain $K_1$ is inversely correlated with the steering angular velocity $ω_h$. As a result, the gain $K_1$ is equal to or higher than zero, and it becomes larger in the return steering state than in the feed steering state. In the feed steering state, the gain $K_1$ decreases with the increase in the steering angular velocity $ω_h$, and it becomes a constant minimum value when the value of the steering angular velocity $ω_h$ is equal to or higher than a fixed value. In the return steering state, the gain $K_1$ increases with the increase in the steering angular velocity $ω_h$, and it becomes a constant maximum value when the value of the steering angular velocity $ω_h$ is equal to or higher than a fixed value. For example, the minimum value of gain $K_1$ is taken as 0 and the maximum value thereof is taken as 1. A signal corresponding to the gain $K_1$ output from the calculation element 52 is input into a coefficient calculation element 54 after the unnecessary high-frequency component is removed therefrom with a low-pass filter 53.

In the calculation element 55 of the first coefficient setting element 41, a gain $K_2$ corresponding to the vehicle speed v is calculated. The relationship between the gain $K_2$ and vehicle speed v is predetermined and stored in the controller 20. As shown in the calculation element 55 in FIG. 4, the gain $K_2$ in the present embodiment is equal to or higher than zero, increases with the increase in the vehicle speed v and becomes a constant maximum value when the vehicle speed v is equal to or higher than a constant value. For example, the minimum value of the gain $K_2$ is taken as 0.5 and the maximum value thereof is taken as 1. A signal corresponding to the gain $K_2$ is output from the calculation element 55 and then input into the coefficient calculation element 54.

In the calculation element 56 of the first coefficient setting element 41, an assist gradient R corresponding to the detected steering torque τ and detected vehicle speed v is calculated. Here, the variation ratio ($dτ_o/dτ$) of the basic assist torque $τ_o$ to the steering torque τ is taken as the assist gradient R, and the correspondence relationship between the steering torque τ, basic assist torque $τ_o$ and vehicle speed v is stored in the controller 20. The assist gradient R is calculated from this stored relationship, detected steering torque τ and detected vehicle speed v. In the present embodiment, a characteristic is demonstrated in which, as shown in the calculation element 56 in FIG. 4, the assist gradient R increases when the magnitude of the steering torque τ increases and the vehicle speed v decreases. A signal corresponding to the assist gradient R is output from the calculation element 56 and then input into the calculation element 57.

In the calculation element 57 of the first coefficient setting element 41, a parameter $a_1$ corresponding to the assist gradient R is calculated. The relationship between the parameter $a_1$ and assist gradient R is predetermined and stored in the controller 20. In the present embodiment, as shown in the calculation element 57 in FIG. 4, the parameter $a_1$ is equal to or higher than zero, set to a constant maximum value when the assist gradient R is equal to or lower than a constant value and gradually decreased to a minimum value ($=a_2$) with the increase of the assist gradient R from the constant value. For example, the maximum value of the parameter $a_1$ is taken as 1 and the minimum value thereof is taken as 0.3, and it becomes a minimum value $a_2$ during steering when the vehicle is stopping. A signal corresponding to the parameter $a_1$ is output from the calculation element 57 and then input into the coefficient calculation element 54.

In the coefficient calculation element 54, the coefficient α corresponding to the gains $K_1$, $K_2$ and parameters $a_1$, $a_2$ is calculated. In the present embodiment, the following calculation formula is used for the calculation of the coefficient α:

$$α = a_1 + (a_2 - a_1)K_1K_2$$

The parameter $a_1$ that is inversely correlated with the assist gradient R, the gain $K_1$ that is inversely correlated with the steering angular velocity $ω_h$ and the gain $K_2$ that is correlated with the vehicle speed v are equal to or lower than 1 and equal to or higher than 0. The gain $K_1$ in the return steering state is larger than that in the feed steering state. The minimum value of $a_1$ is $a_2$, so that $a_1 \geq a_2$. Therefore, the coefficient α has a characteristic such that it becomes less in the return steering state than in the feed steering state, decreases with the increase in the magnitude of the steering angular velocity $ω_h$ in the return steering state, increases with the increase in the magnitude of the steering angular velocity $ω_h$ in the feed steering state, decreases with the increase in the vehicle speed v and increases with the increase in the assist gradient R.

The coefficient α of the transfer function G1(s) is set by inputting the signal corresponding to the coefficient α into the phase control element 30 via a low-pass filter 58. The assist gradient R increases with the increase in the steering torque τ, while the parameter $a_1$ corresponding to the assist gradient R decreases with the increase in the steering torque τ, so the low-pass filter 58 removes the high-frequency component of the signal corresponding to the coefficient α in order to prevent the divergence.

Figure 5:
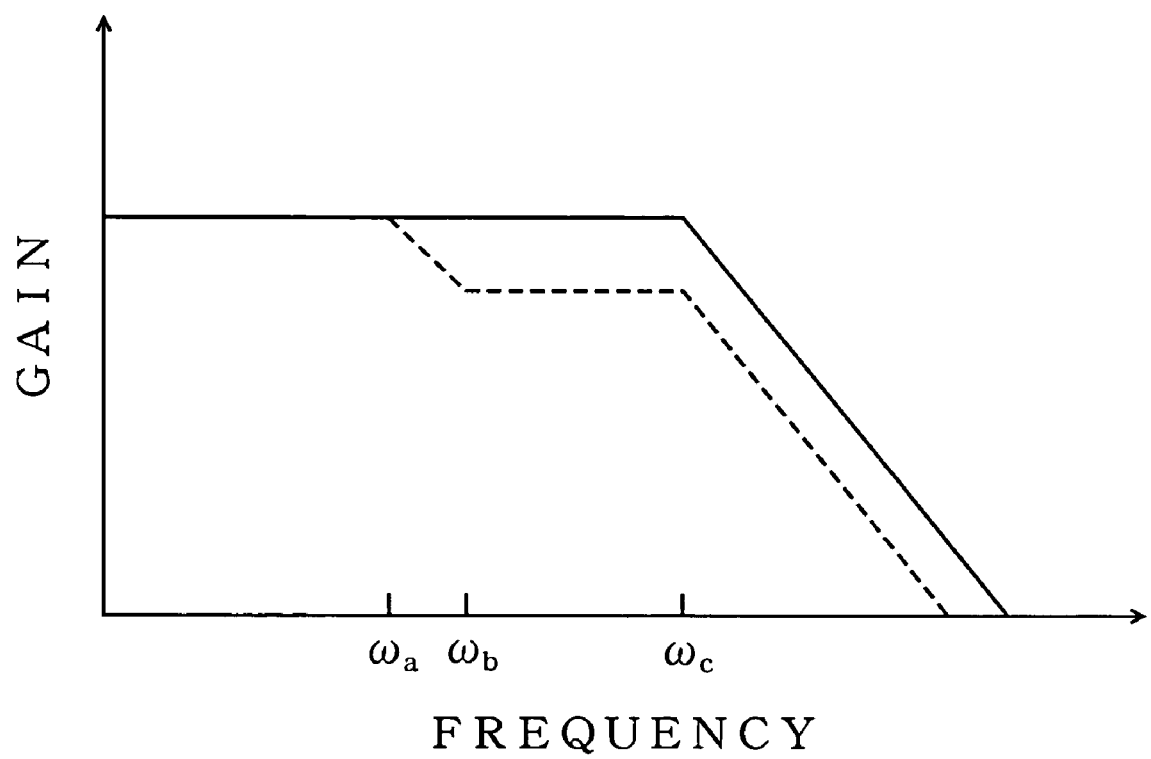
FIG. 5 illustrates a frequency response characteristic of output to input of a torque sensor in the electric power steering apparatus of the embodiment of the present invention.

FIG. 5 shows a frequency response characteristic of the output to input of the torque sensor 22, wherein the abscissa corresponds to the frequency of the output signal of the torque sensor 22, and the ordinate corresponds to the gain of the output to input of the torque sensor 22. In FIG. 5, the characteristic in case where the coefficient α of the transfer function G1(s) of the phase control element 30 is 1 is shown by a solid line, and the characteristic in case where the coefficient α is less than 1 is shown by a broken line. Here, $ω_a = 1/(2πT_1)$, $ω_b = 1/(2παT_1)$, $ω_c$ is a cut-off frequency of the low-pass filter 31. Provided there is no difference in the vehicle speed v, assist gradient R and other conditions, the coefficient α becomes smaller in the return steering state than in the feed steering state; therefore the gain in the return steering state decreases in comparison with that in the feed steering state in the high frequency side of the frequency response characteristic of the output to input of the torque sensor 22. Thus, the phase control characteristic of the phase control element 30 is changed according to the judgment by the steering state judgment element 40 so that the response of the variation of the target drive current I* to the variation of the detected steering torque τ decreases in the return steering state in comparison with that in the feed steering state. Furthermore, provided there is no difference in the vehicle speed v, steering state and other conditions, the coefficient α increases with the increase in the assist gradient R; therefore the gain is decreased when the assist gradient R increases in comparison with that before the increase of the assist gradient R in the high frequency side of the frequency response characteristic of the output to input of the torque sensor 22. Thus, the phase control characteristic of the phase control element 30 is changed according to the assist gradient R so that the response of the variation of the target drive current I* to the variation of the detected steering torque τ decreases when the assist gradient R increases in comparison with that before the increase of the assist gradient R.

Figure 6:
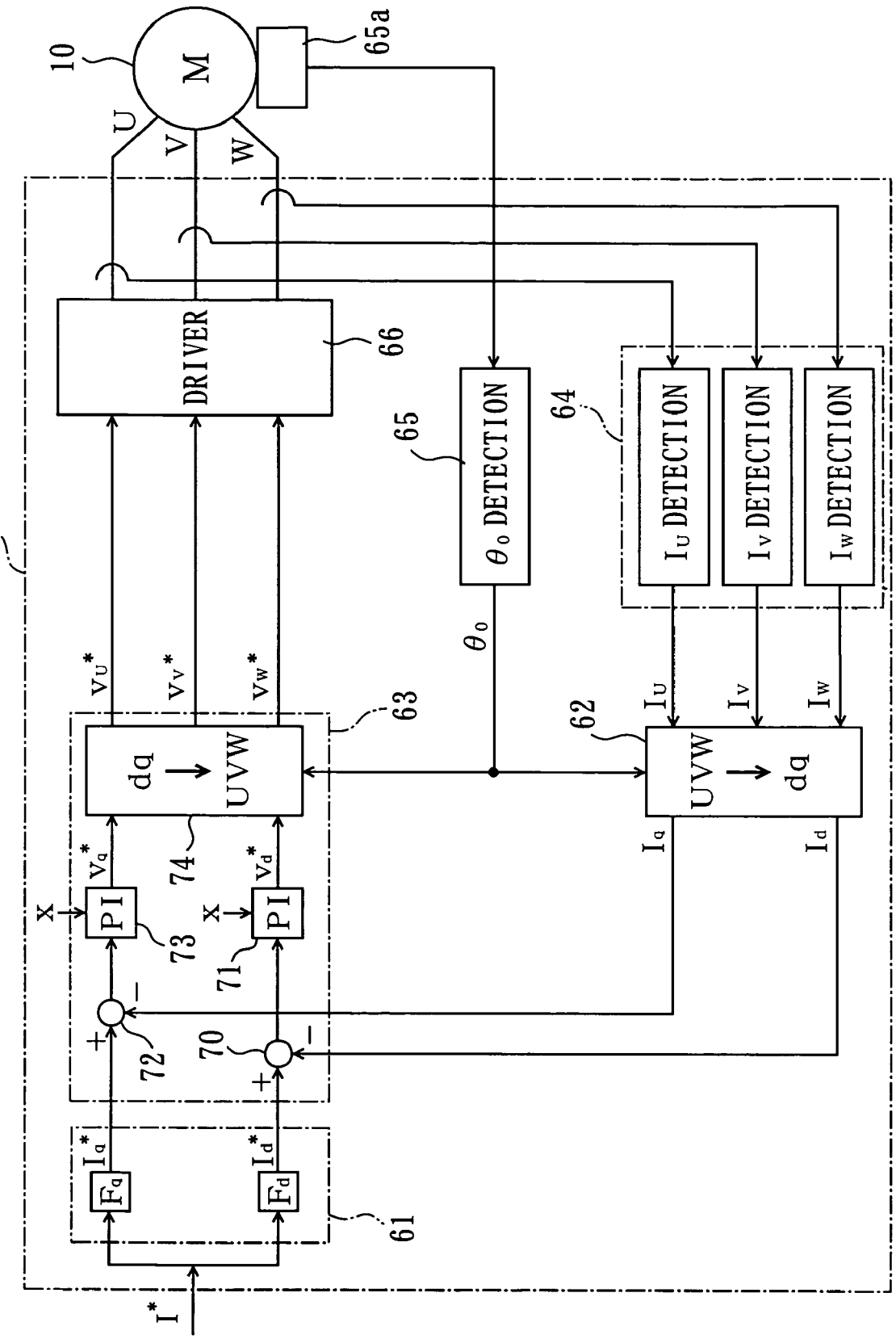
FIG. 6 is a block diagram illustrating an output control element in the electric power steering apparatus of the embodiment of the present invention.

The signal corresponding to the target drive current I* is input into an output control element 60 of the motor 10. As shown in the block diagram in FIG. 6, the output control element 60 comprises a dq axes target current calculation element 61, a dq axes actual current calculation element 62, an applied voltage calculation element 63, a current detection element 64, a rotation position detection element 65 and a motor driver 66.

The dq axes target current calculation element 61 calculates the d axis target current $I_d^*$ for generating the magnetic field in the direction of d axis and the q axis target current $I_q^*$ for generating the magnetic field in the direction of q axis as the value corresponding to the calculated target drive current I*, wherein the axis along the direction of magnetic flux of a field magnet of a rotor in the motor 10 is taken as the d axis, and the axis perpendicular to the d axis and rotation axis of the rotor is taken as the q axis. For example, a function $F_d$ expressing the relationship between the target drive current I* and the d axis target current $I_d^*$ and a function $F_q$ expressing the relationship between the target drive current I* and the q axis target current $I_q^*$ are predetermined and stored in the controller 20, and the d axis target current $I_d^*$ and q axis target current $I_q^*$ are calculated from the functions $F_d$, $F_q$ and the target drive current I*. Known functions can be used as the functions $F_d$, $F_q$.

The dq axes actual current calculation element 62 calculates the d axis actual current $I_d$ for generating the magnetic field in the d axis direction and the q axis actual current $I_q$ for generating the magnetic field in the q axis direction based on the actual currents $I_U$, $I_V$, $I_W$ detected by the current detection element 64 and the rotation position $θ_o$ detected by the rotation position detection element 65. The current detection element 64 constitutes a detection element for detecting the actual currents $I_U$, $I_V$, $I_W$ flowing in respective coils of U phase, V phase and W phase in the motor 10 as actual output values of the motor 10. The rotation position detection element 65 detects the rotation angle of the rotor to the predetermined reference position in a stator of the motor 10 as the rotation position $θ_o$ based on the signal from a rotation angle sensor 65a such as a resolver, encoder or the like mounted on the motor 10. The calculation in the dq axes actual current calculation element 62 can be performed by using a known calculation formula.

The applied voltage calculation element 63 calculates voltages $v_U^*$, $v_V^*$, $v_W^*$ applied to the coils based on the d axis target current $I_d^*$, q axis target current $I_q^*$, d axis actual current $I_d$, q axis actual current $I_q$, and detected rotation position $\theta_o$. To be more precise, the d axis target voltage $v_d^*$ is calculated by calculating the deviation between the d axis target current $I_d^*$ and the d axis actual current $I_d$ with a deviation calculation element 70 and performing the PI (proportional integral) control calculation of this deviation in a d axis PI control calculation element 71. The q axis target voltage $v_q^*$ is calculated by calculating the deviation between the q axis target current $I_q^*$ and the q axis actual current $I_q$ with a deviation calculation element 72 and performing the PI control calculation of this deviation in a q axis PI control calculation element 73. The applied voltages $v_U^*$, $v_V^*$, $v_W^*$ are calculated as output command values of the motor 10 in a three-phase voltage calculation element 74 from the d axis target voltage $v_d^*$, q axis target voltage $v_q^*$ and detected rotation position $\theta_o$. The calculation in the three-phase voltage calculation element 74 can be conducted by a known calculation formula. As a result, the deviations between the respective dq axes target currents $I_d^*$, $I_q^*$ corresponding to the target drive current I* that is a target output value of the motor 10 and the respective dq axes actual currents $I_d$, $I_q$ corresponding to the actual output values correspond to the applied voltages $v_U^*$, $v_V^*$, $v_W^*$ that are the output command values of the motor 10.

The motor driver 66 drives the motor 10 by applying the calculated applied voltages $v_U^*$, $v_V^*$, $v_W^*$ to the coils of the motor 10, for example, by PWM (pulse width modulation) control. As a result, the output control element 60 determines the applied voltages $v_U^*$, $v_V^*$, $v_W^*$ that are the output command values by the calculations including the PI control calculation and controls the applied voltages $v_U^*$, $v_V^*$, $v_W^*$ corresponding to the deviations between the respective dq axes target currents $I_d^*$, $I_q^*$ corresponding to the target drive current I* that is a target output value of the motor 10 and the respective dq axes actual currents $I_d$, $I_q$ corresponding to the actual output values so as to eliminate the deviations. By such control, the motor 10 generates steering assist power corresponding to the target drive current I*.

Figure 7:
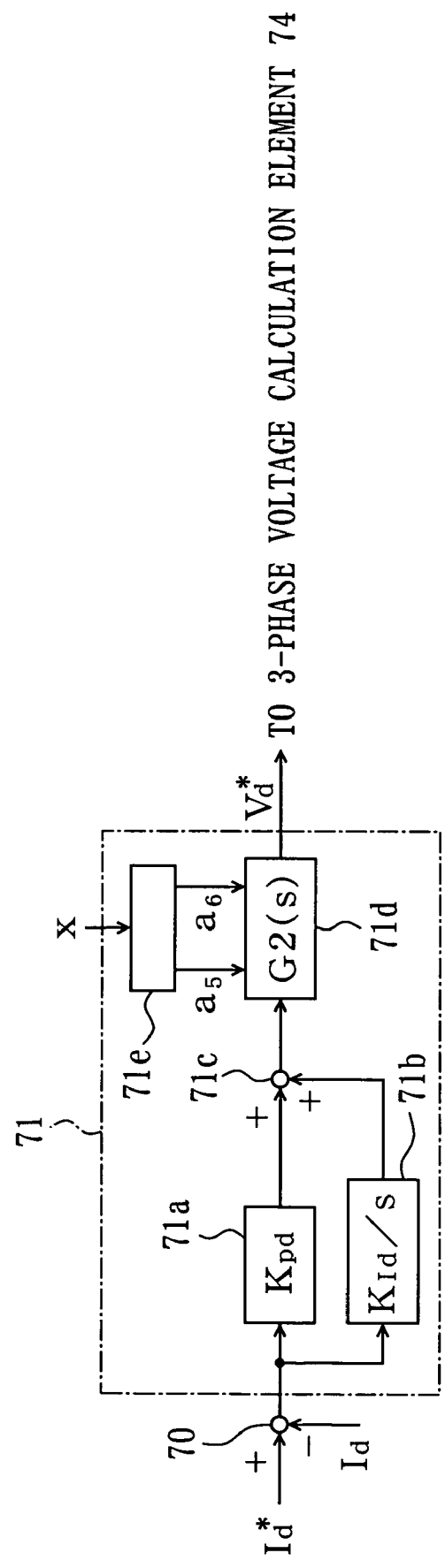
FIG. 7 is a block diagram illustrating a d axis proportional integral control calculation element in the electric power steering apparatus of the embodiment of the present invention.

FIG. 7 is a block diagram of the d axis PI control calculation element 71 that calculates the d axis target voltage $v_d^*$ based on the deviation between the d axis target current $I_d^*$ and d axis actual current $I_d$. The d axis PI control calculation element 71 has a proportional calculation element 71a, an integrator 71b, an addition element 71c, a d axis phase compensator 71d and a d axis coefficient setting element 71e. In the present embodiment, the d axis target voltage $v_d^*$ is calculated from the deviation $(I_d^* - I_d)$ between the d axis target current $I_d^*$ and d axis actual current $I_d$ by the following formula $$v_d^* = (K_{pd} + K_{Id}/s)G2(s)(I_d^* - I_d)$$

where $K_{pd}$ is a gain of the proportional calculation element 71a, $K_{Id}$ is a gain of the integrator 71b and G2(s) is a transfer function of the d axis phase compensator 71d.

The transfer function G2(s) is expressed by the following formula $$G2(s) = [(1 + a_5 T_5 s)(1 + a_6 T_6 s)] / [(1 + T_5 s)(1 + T_6 s)].$$

where $T_5$, $T_6$ are time constants, $a_5$, $a_6$ are coefficients, $T_5 > T_6$, $a_5 \leq 1$ and $a_6 \geq 1$.

The coefficients $a_5$, $a_6$ of the transfer function G2(s) are set in the d axis coefficient setting element 71e. The steering state judgment signal x from the steering state judgment element 40 is input into the d axis coefficient setting element 71e, and the coefficients $a_5$, $a_6$ set by the d axis coefficient setting element 71e are changed according to the judgment by the steering state judgment element 40. Thus, it is set as $a_5 = a_6 = 1$ in the feed steering state, and it is set as $a_5 < 1$ and $a_6 > 1$ in the return steering state.

Figure 8:
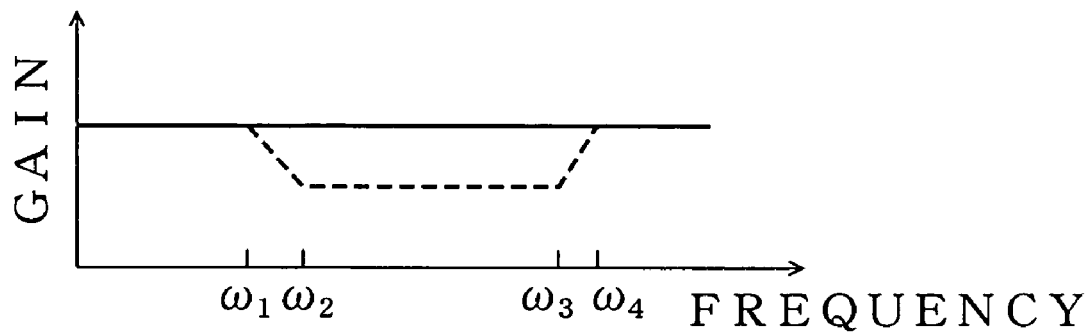
FIG. 8 illustrates a frequency response characteristic of output to input of a proportional calculation element of the d axis proportional integral control calculation element in the electric power steering apparatus of the embodiment of the present invention.

FIG. 8 shows a frequency response characteristic of the output to input of the proportional calculation element 71a, in which the abscissa corresponds to the frequency of the signal corresponding to the d axis target current $I_d^*$, and the ordinate corresponds to the gain of the output to the input of the proportional calculation element 71a. In FIG. 8, in the case where the coefficients $a_5$, $a_6$ of the transfer function G2(s) are 1, that is $a_5 = a_6 = 1$, the characteristic is shown by a solid line, and in the case where $a_5 < 1$ and $a_6 > 1$, the characteristic is shown by a broken line. Here, $\omega_1 = 1/(2\pi T_5)$, $\omega_2 = 1/(2\pi a_5 T_5)$, $\omega_3 = 1/(2\pi a_6 T_6)$ and $\omega_4 = 1/(2\pi T_6)$.

Figure 9:
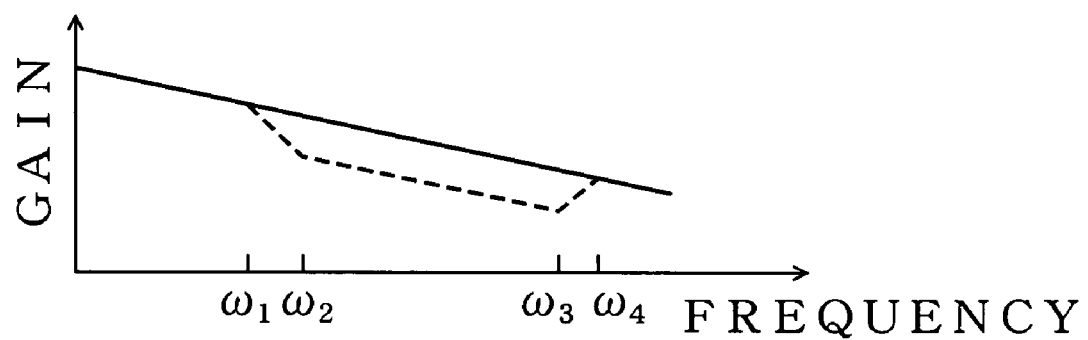
FIG. 9 illustrates a frequency response characteristic of output to input of an integrator of the d axis proportional integral control calculation element in the electric power steering apparatus of the embodiment of the present invention.

FIG. 9 shows a frequency response characteristic of the output to input of the integrator 71b, in which the abscissa corresponds to the frequency of the signal corresponding to the d axis target current $I_d^*$, and the ordinate corresponds to the gain of the output to the input of the integrator 71b. In FIG. 9, in the case where the coefficients $a_5$, $a_6$ of the transfer function G2(s) are 1, that is $a_5 = a_6 = 1$, the characteristic is shown by a solid line, and in the case where $a_5 < 1$ and $a_6 > 1$, the characteristic is shown by a broken line. Here, $\omega_1 = 1/(2\pi T_5)$, $\omega_2 = 1/(2\pi a_5 T_5)$, $\omega_3 = 1/(2\pi a_6 T_6)$ and $\omega_4 = 1/(2\pi T_6)$.

Figure 10:
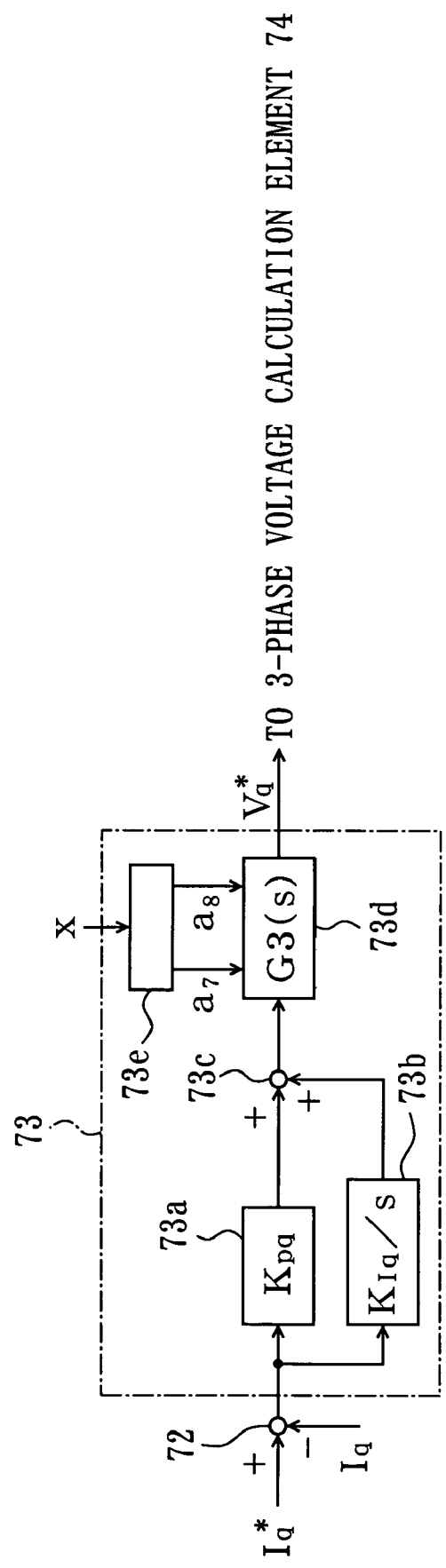
FIG. 10 is a block diagram illustrating a q axis proportional integral control calculation element in the electric power steering apparatus of the embodiment of the present invention.

FIG. 10 is a block diagram of the q axis PI control calculation element 73 that calculates the q axis target voltage $v_q^*$ based on the deviation between the q axis target current $I_q^*$ and q axis actual current $I_q$. The q axis PI control calculation element 73 has a proportional calculation element 73a, an integrator 73b, an addition element 73c, a q axis phase compensator 73d and a q axis coefficient setting element 73e. In the present embodiment, the q axis target voltage $v_q^*$ is calculated from the deviation $(I_q^* - I_q)$ between the q axis target current $I_q^*$ and q axis actual current $I_q$ by the following formula $$v_q^* = (K_{pq} + K_{Iq}/s)G3(s)(I_q^* - I_q)$$

where $K_{pq}$ is a gain of the proportional calculation element 73a, $K_{Iq}$ is a gain of the integrator 73b and G3(s) is a transfer function of the q axis phase compensator 73d.

The transfer function G3(s) is calculated by the following formula $$G3(s) = [(1 + a_7 T_7 s)(1 + a_8 T_8 s)] / [(1 + T_7 s)(1 + T_8 s)]$$

where $T_7$, $T_8$ are time constants, $a_7$, $a_8$ are coefficients, $T_7 > T_8$, $a_7 \leq 1$ and $a_8 \geq 1$.

The coefficients $a_7$, $a_8$ of the transfer function G3(s) are set in the q axis coefficient setting element 73e. The steering state judgment signal x from the steering state judgment element 40 is input into the q axis coefficient setting element 73e, and the coefficients $a_7$, $a_8$ set by the q axis coefficient setting element 73e are changed according to the judgment by the steering state judgment element 40. Thus, it is set as $a_7 = a_8 = 1$ in the feed steering state, and it is set as $a_7 < 1$ and $a_8 > 1$ in the return steering state.

Figure 11:
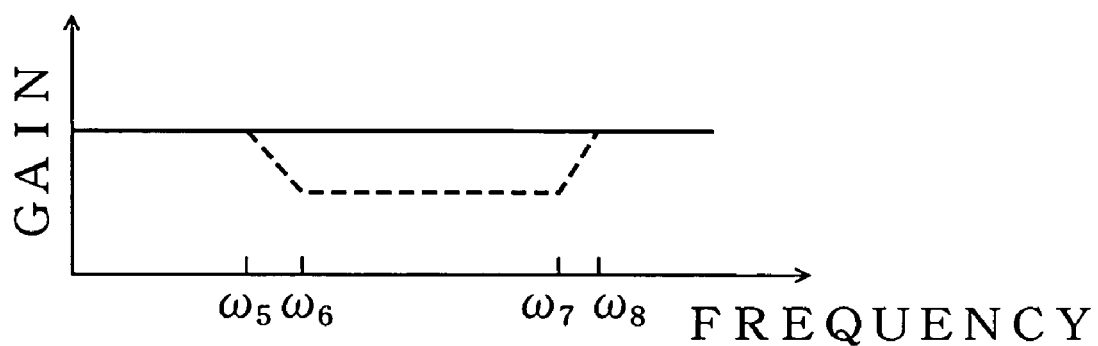
FIG. 11 illustrates a frequency response characteristic of output to input of a proportional calculation element of the q axis proportional integral control calculation element in the electric power steering apparatus of the embodiment of the present invention.

FIG. 11 shows a frequency response characteristic of the output to input of the proportional calculation element 73a, in which the abscissa corresponds to the frequency of the signal corresponding to the q axis target current $I_q^*$, and the ordinate corresponds to the gain of the output to the input of the proportional calculation element 73a. In FIG. 11, in the case where the coefficients $a_7$, $a_8$ of the transfer function $G3(s)$ are 1, that is $a_7=a_8=1$, the characteristic is shown by a solid line, and in the case where $a_7<1$ and $a_8>1$ the characteristic is shown by a broken line. Here, $\omega_5=1/(2\pi T_7)$, $\omega_6=1/(2\pi a_7 T_7)$, $\omega_7=1/(2\pi a_8 T_8)$ and $\omega_8=1/(2\pi T_8)$.

Figure 12:
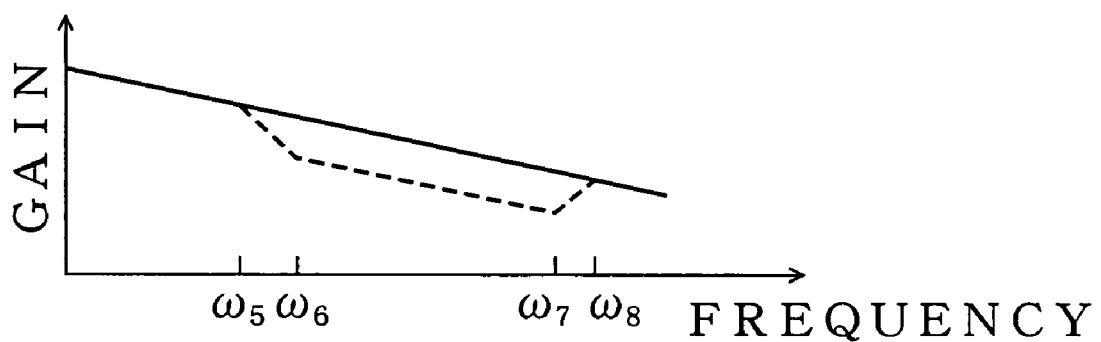
FIG. 12 illustrates a frequency response characteristic of output to input of an integrator of the q axis proportional integral control calculation element in the electric power steering apparatus of the embodiment of the present invention.

FIG. 12 shows a frequency response characteristic of the output to input of the integrator 73b, in which the abscissa corresponds to the frequency of the signal corresponding to the q axis target current $I_q^*$, and the ordinate corresponds to the gain of the output to the input of the integrator 73b. In FIG. 12, in the case where the coefficients $a_7$, $a_8$ of the transfer function $G3(s)$ are 1, that is $a_7=a_8=1$, the characteristic is shown by a solid line, and in the case where $a_7<1$ and $a_8>1$, the characteristic is shown by a broken line. Here, $\omega_5=1/(2\pi T_7)$, $\omega_6=1/(2\pi a_7 T_7)$, $\omega_7=1/(2\pi a_8 T_8)$ and $\omega_8=1/(2\pi T_8)$.

As described above, by changing the coefficients $a_5$, $a_6$, $a_7$ and $a_8$ of the transfer functions $G2(s)$ and $G3(s)$ according to the judgment by the steering state judgment element 40, the gain in the return steering state is decreased in comparison with that in the feed steering state in the high frequency side of the frequency response characteristic of the applied voltages $v_U^*$, $v_V^*$, $v_W^*$ corresponding to the output command value to the deviations between the respective dq axes target currents $I_d^*$, $I_q^*$ corresponding to the target output value of the motor 10 and the respective dq axes actual currents $I_d$, $I_q$ corresponding to the actual output value. In other words, the output control characteristic of the output control element 60 for the motor 10 is changed according to the judgment by the steering state judgment element 40 so that the response of the variation of the output command value to the variation of the deviation between the target output value and the actual output value of the motor 10 in the return steering state decreases in comparison with that in the feed steering state. Here, the change of the output control characteristic of the output control element 60 is synchronized with the change of the phase control characteristic of the phase control element 30 according to the judgment by the steering state judgment element 40.

With the above-described embodiment, the response of the variation of the target drive current I* corresponding to the target output value to the variation of the steering torque τ in the return steering state is decreased in comparison with that in the feed steering state, by varying the phase of the signal that varies correspondingly to the steering torque τ detected with the torque sensor 22, by the change of the phase control characteristic of the phase control element 30. As a result, even if the steering torque τ acting in the feed steering direction decreases abruptly during the return steering, a rapid decrease of the output of the motor 10 for generating the steering assist power can be inhibited. Therefore, the convergence of the steering wheel 2 can be improved because there is no rapid variation in the steering assist power acting in the feed steering direction during the return steering. At this time, a rapid decrease in the target drive current I* is inhibited even when the actual steering torque decreases abruptly during the return steering, and the response of the variation of the target drive current I* to the variation of the steering torque τ is decreased reliably, by decreasing the gain in the return steering state in comparison with that in the feed steering state in the high frequency side of the frequency response characteristic of the output to input of the torque sensor 22. Furthermore, by changing the output control characteristic of the output control element 60 synchronously with the change of the phase control characteristic of the phase control element 30, the response of the variation of the applied voltages $v_U^*$, $v_V^*$, $v_W^*$ corresponding to the output command value to the variation of the deviations between the respective dq axes target currents $I_d^*$, $I_q^*$ corresponding to the target output value of the motor 10 and the respective dq axes actual currents $I_d$, $I_q$ corresponding to the actual output value can be reduced synchronously with the decrease in the response of the variation of the target drive current I* to the variation of the steering torque τ. As a result, the output of the motor 10 can be reliably prevented from decreasing rapidly during the return steering. At this time, by decreasing the gain in the return steering state in comparison with that in the feed steering state in the high frequency side of the frequency response characteristic of the output command value to this deviation, a rapid decrease in the output of the motor 10 can be reliably inhibited even when the steering torque τ acting in the feed steering direction decreases abruptly during the return steering. Furthermore, the gain is decreased when the assist gradient R increases in comparison with that before the increase of the assist gradient R in the high frequency side of the frequency response characteristic of the output to input of the torque sensor 22; therefore the stability of control can be raised when the assist gradient R increases. Moreover, in the feed steering state, the sum of the basic assist current $I_o$ and the additional assist current $I_a$, which is inversely correlated with the variation rate of the detected steering torque τ, becomes the target drive current I*, so that the output of the motor 10 is prevented from getting too large in the case of rapid steering in the feed steering state, whereby the steering feeling can be improved. Moreover, the basic assist current $I_o$ becomes the target drive current I* in the return steering state, so that the output of the motor 10 can be prevented from decreasing rapidly in the case where the steering torque τ decreases abruptly as a result of, e.g., removing hands from the steering wheel 2 in the return steering state.

The present invention is not limited to the above-described embodiment. For example, the phase of the signal corresponding to the basic assist current $I_o$ can be controlled with a phase control element disposed between the calculation element 32 and addition element 46, instead of the phase control element 30 disposed between the torque sensor 22 and calculation element 32. In other words, the phase control element is not limited to an element that directly controls the output signal of the torque sensor, and it can control the phase of the signal such as the basic assist current $I_o$ corresponding to the detected steering torque. Furthermore, no specific limitation is placed on the correspondence relationship between the steering torque and the target output value of the motor, provided that it gives an adequate steering assist power. For example, the target output value of the motor can vary according to the steering angle. Furthermore, no specific limitation is placed on the relationship between the output command value and the deviation between the target output value and actual output value of the motor, provided that the output of the motor can be controlled according to the output command value so that this deviation is eliminated. For example, the applied voltages $v_U^*$, $v_V^*$, $v_W^*$ can be determined as the output command values of the motor 10, by determining the target currents $I_U^*$, $I_V^*$, $I_W^*$ respectively corresponding to U, V and W phases of the motor 10 from the target drive current I* and detected rotation position $\theta_o$ instead of the dq axes target currents $I_d^*$, $I_q^*$ in the above-described embodiment, and performing the PI control calculation of the deviations $(I_U^*-I_U)$, $(I_V^*-I_V)$ and $(I_W^*-I_W)$ between the respective target currents $I_U^*$, $I_V^*$, $I_W^*$ and the respective actual currents $I_U$, $I_V$, $I_W$ of the respective coils of U, V and W phases. In this case, the gain in the return steering state can be decreased in comparison with that in the feed steering state in the high frequency side of the frequency response characteristic of the applied voltages $v_U^*$, $v_V^*$, $v_W^*$ to the deviations $(I_U^*-I_U)$, $(I_V^*-I_V)$, $(I_W^*-I_W)$. Furthermore, a mechanism for transmitting the output of the motor for generating the steering assist power to the steering system is not limited to that of the embodiment, provided that the steering assist power can be supplied. For example, the steering assist power can be supplied by driving a ball nut engaged with a ball screw integrated with the rack by the output of the motor.

What is claimed is:

1. An electric power steering apparatus, comprising:
    a motor for generating steering assist power;
    a torque sensor for detecting steering torque;
    a storage element for storing a corresponding relationship between the steering torque and a target output value of said motor;
    a calculation element for calculating the target output value with the detected steering torque and the corresponding relationship;
    a detection element for detecting an actual output value of said motor;
    an output control element for controlling output of said motor according to an output command value corresponding to a deviation between said target output value and said actual output value so as to eliminate said deviation;
    a phase control element for controlling a phase of a signal corresponding to the detected steering torque; and
    a steering state judgment element for judging whether a steering wheel is in a return steering state in which the steering wheel is steered toward the straight traveling steering position or a feed steering state in which the steering wheel is steered away from the straight traveling steering position, wherein
    a phase control characteristic of said phase control element is changed according to the judgment by said steering state judgment element so that a response of a variation of said target output value to a variation of said detected steering torque in the return steering state decreases in comparison with that in the feed steering state, and
    an output control characteristic of said output control element is changed according to the judgment by said steering state judgment element synchronously with the change of the phase control characteristic of said phase control element so that a response of a variation of said output command value to a variation of the deviation between said target output value and said actual output value in the return steering state decreases in comparison with that in the feed steering state.

2. The electric power steering apparatus according to claim 1, wherein
    the phase control characteristic of said phase control element is changed according to the judgment by said steering state judgment element by decreasing a gain in the return steering state in comparison with a corresponding gain in the feed steering state in a high frequency side of a frequency response characteristic of output to input of said torque sensor.

3. The electric power steering apparatus according to claim 1, wherein
    said output control element determines said output command value by calculations including at least a proportional integral control calculation; and
    the output control characteristic of said output control element is changed by decreasing a gain in the return steering state in comparison with a corresponding gain in the feed steering state in a high frequency side of a frequency response characteristic of said output command value to said deviation.

4. The electric power steering apparatus according to claim 1, further comprising:
    a calculation element for calculating variation rate of the detected steering torque, wherein
    the target output value is decreased by the increase in the variation rate of the detected steering torque in the feed steering state, and the target output value is uncorrelated with the variation rate of the detected steering torque in the return steering state.

5. An electric power steering apparatus, comprising:
    a motor for generating steering assist power;
    a torque sensor for detecting steering torque;
    a storage element for storing a corresponding relationship between the steering torque and a target output value of said motor;
    a calculation element for calculating the target output value with the detected steering torque and the corresponding relationship;
    a detection element for detecting an actual output value of said motor;
    an output control element for controlling output of said motor according to an output command value corresponding to a deviation between said target output value and said actual output value so as to eliminate said deviation;
    a phase control element for controlling a phase of a signal corresponding to the detected steering torque;
    a steering state judgment element for judging whether a steering wheel is in a return steering state in which the steering wheel is steered toward the straight traveling steering position or a feed steering state in which the steering wheel is steered away from the straight traveling steering position;
    a storage element for storing a corresponding relationship between the steering torque and basic assist torque, wherein
    a phase control characteristic of said phase control element is changed according to the judgment by said steering state judgment element so that a response of a variation of said target output value to a variation of said detected steering torque in the return steering state decreases in comparison with that in the feed steering state,
    an output control characteristic of said output control element is changed according to the judgment by said steering state judgment element synchronously with the change of the phase control characteristic of said phase control element so that a response of a variation of said output command value to a variation of the deviation between said target output value and said actual output value in the return steering state decreases in comparison with that in the feed steering state,
    the corresponding relationship between the steering torque and the basic assist torque is set so that an assist gradient that is a variation rate of the basic assist torque to the steering torque varies in response to variation of the detected steering torque, and
    the phase control characteristic of said phase control element is changed according to the assist gradient so that the gain is decreased when the assist gradient increases in comparison with a corresponding gain before the increase of the assist gradient in a high frequency side of the frequency response characteristic of the output to input of said torque sensor.

* * * * *